United States Patent [19]

Applegate

[11] 4,418,553
[45] Dec. 6, 1983

[54] VEHICLE FUEL CAP LOCKING DEVICE

[76] Inventor: Edward R. Applegate, 520 S. Dennis Ave., Decatur, Ill. 62522

[21] Appl. No.: 185,524

[22] Filed: Sep. 9, 1980

[51] Int. Cl.³ .................. B65D 55/02; E05B 65/12; E05C 19/18; E05C 21/00
[52] U.S. Cl. ........................................ 70/164; 70/170; 70/238; 292/288; 292/289; 296/1 C
[58] Field of Search ............... 70/158, 170, 166, 164, 70/163, 171, 172, 211, 237, 238, 258, 430, 265; 296/1 C; 292/289, 288, 281; 220/315

[56] References Cited

U.S. PATENT DOCUMENTS

| | | | |
|---|---|---|---|
| 625,304 | 5/1899 | Kendrick | 292/288 X |
| 1,656,686 | 1/1928 | Tjepkes | 70/170 X |
| 1,711,535 | 5/1929 | Leet | 70/238 |
| 2,729,500 | 1/1956 | Dickenshied et al. | 296/1 C X |
| 2,798,759 | 7/1957 | Frederick et al. | 296/1 C X |
| 3,704,606 | 12/1972 | Russek, Jr. | 70/164 |

FOREIGN PATENT DOCUMENTS

| | | | |
|---|---|---|---|
| 266863 | 6/1966 | Australia | 292/288 |
| 2254100 | 5/1973 | Fed. Rep. of Germany | 292/288 |
| 581616 | 9/1924 | France | 292/288 |
| 940103 | 12/1948 | France | 70/170 |

Primary Examiner—Roy D. Frazier
Assistant Examiner—Carl F. Pietruszka

[57] ABSTRACT

In a locking device for use with a vehicle having a trunk compartment and a fuel tank filling outlet positioned adjacent and below a vertical lower wall of the trunk compartment, with the vehicle also having a closeable lid member which closes by engaging said trunk compartment lower wall, said device including a removeable cap closure member for the fuel tank inlet which tightens onto the fuel tank inlet by rotational movement and which has a slot in the exterior thereof, and a locking bar element having configured upper and lower portions, with the upper portion being adapted to fit over the top of the trunk compartment lower wall and engage the underside of the trunk lid, and with the lower portion having a lower terminus which is adapted to seat into the slot in said fuel tank filler outlet cap to lock thereby the cap in place and prevent its removal.

2 Claims, 3 Drawing Figures

VEHICLE FUEL CAP LOCKING DEVICE

BACKGROUND OF THE INVENTION

This invention relates to a locking device for fuel tank outlet cap members of vehicles, and more particularly to a locking device for vehicles to prevent the theft of fuel from such vehicles.

Since the advent of internal combustion-driven vehicles, the theft of fuel from the tanks of same has presented problems. To overcome or minimize the threat of such thefts, various approaches have been suggested previously, including modifications of the vehicle body design to enclose the filler tube outlet for the tanks within the vehicle's trunk or other locked compartment, such as a separate well for same or behind a license plate holder which is locked in place, modifications of the filler tube caps to include key-operated locks, and closures which cover the filler tube caps. Examples of prior such approaches are described in U.S. Pat. Nos. 2,869,918; 2,798,759; 3,704,606; and 3,912,322.

Previous suggested approaches to remedy the fuel theft problem, however, have not proved to be totally satisfactory due to relative non-acceptance by consumers of unconventional body designs, the use of extra keys, and/or relatively complicated procedures and equipment required to install prior anit-theft devices or use same. The seemingly more popular approach heretofor available, i.e., the use of key-operated caps for the filler tube outlets, further recently has been plagued by a general shortage of such caps, and, at any rate, this approach still has suffered from a need for an extra key to be kept by the user. More importantly, the over-all problem of fuel theft has become aggravated by the recent meteoric rise in the price of fuel.

Accordingly, a situation has developed, particularly with regard to vehicles already in use, where a significant need exists for an inexpensive, simple to install, and reliable fuel anti-theft device which is versatile in use, yet requires no extra keys or modifications of the vehicle, and a search has continued in the art for such a device.

OBJECTS OF THE PRESENT INVENTION

Accordingly, it is the primary object of the present invention to provide an improved fuel anti-theft device for vehicles.

Another object of the present invention is to provide an improved fuel anti-theft device for vehicles which is inexpensive and simple in equipment and installation expenditures, yet is effective.

An additional object of the present invention is to provide an improved fuel anti-theft device which advantageously does not require any modification of the vehicle and further does not require the need for the user to maintain any keys other than those standard for the vehicle.

A further object of the present invention is to provide an improved fuel anti-theft device which advantageously finds versatile use among vehicles already in use.

A particular object of the present invention is to provide an improved fuel anti-theft device which is reliable, inexpensive, and simple to install and utilize, yet does not require uncommon skill and/or tools to install same.

DESCRIPTION OF ACCOMPANYING DRAWINGS

The above and other objects are achieved and are features of the fuel tank filler cap locking device of the present invention which will be described below in detail with particular reference being made to the accompanying drawings of which:

DESCRIPTION OF SPECIFIC EMBODIMENTS

Figure 1:
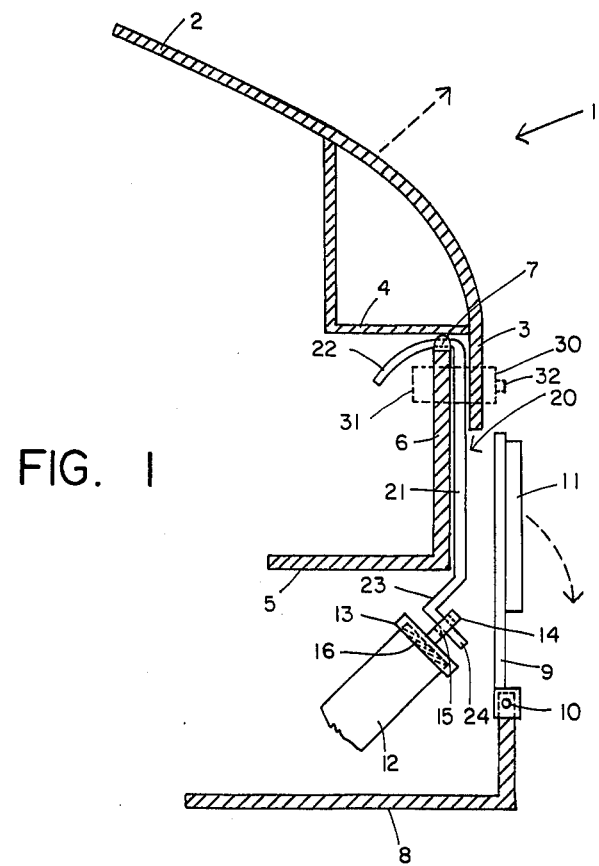
FIG. 1 is a diagrammatic side view, partially is section, of an embodiment of the locking device of the present invention, shown in place.
Figure 3:
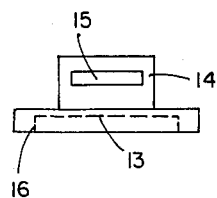
FIG. 3 is a side elevation view showing an embodiment of the slotted tank outlet cap member of the present device, shown in FIG. 1.
Figure 2:
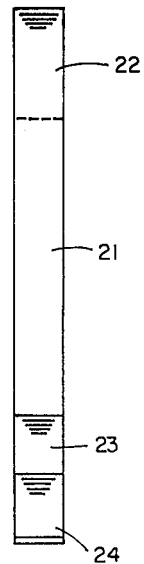
FIG. 2 is a front diagrammatic view showing an embodiment of the locking bar element of the present device, shown in FIG. 1.

With reference to the accompanying drawings, where like numerals refer to like elements, in FIG. 1 numeral one generally designates a body of a combustion engine-driven motor vehicle, which is shown partially broken away and in section for simplicity. As shown, body 1 includes a trunk compartment having a floor wall 5 and a vertical lower wall 6, and a trunk lid element 2 having an interior wall section 4 which normally is positioned above lower wall 6, when lid element 2 is in the closed (shown) condition. Body 1 further includes a wall section 8 positioned below trunk floor 5, in which chamber defined by trunk floor 5 and wall section 8 is located a fuel tank filling inlet 12 for the vehicle.

Although not limiting of the present invention, as shown, body 1 is provided also with a license plate holder 9 (for license plate 11) which is pivotally mounted as at 10 to cover filling tank tube inlet 12 and obscure it from view normally, by holder 10 being spring biased (not shown) toward an upright position.

In accordance with the present invention, a locking device for closing filling tube inlet 12 is provided, which device comprises a removeable closure cap member 13 for tube inlet 12 and a locking bar element designated generally 20.

Cap member 13 by means of conventional means, e.g., cooperating threads 16, and any other suitable similar means, e.g., beveled planeflange combinations, spring-biased tongue-groove combinations, and the like, cooperatively positioned on cap member 13 and tube inlet 12, is adapted to be placed and tightened onto tube inlet 12 by rotation of cap member 13. Cap member 13 is provided on the exterior thereof with a slot 15 which is adapted to receive a bar element. In a more preferred embodiment of the device of the present invention, slot 15 is located in a vertical flange element 14 positioned on the top of cap member 13.

In accordance with the present invention, locking bar element 20 has configured, joined upper and lower portions, as shown, consisting of section combinations 21-22 and 23-24, respectively. Upper section 21-22 extends from its lower end on section 21 at a point adjacent filling tube inlet 12, past, along, and adjacent, with its section 21, to trunk lower wall 6, and, with its section 22, up and then downwardly along a non-linear path, e.g. angular, arcuate, or both, around the top of trunk lower wall 6 to be adapted thereby to engage and abut interior wall section 4 of trunk lid 2, when lid 2 is in the closed position, if one attempts to vertically move bar 20.

Lower postion 23-24 of locking bar 20 has a lower terminus at the end of section 24 which is adapted, by means of its relative shape and positioning, to be slideably received within slot 15 on cap member 13, so that, with bar section 24 so slotted, cap member 13 is retained against rotational movement and against removal from tube inlet 12. In the more preferred embodiments of the present invention wherein slot 15 is located on flange 14 on cap member 13, section 24 of locking bar extends through flange 14.

Advantageously, by means of the locking device of the present invention, a simple, inexpensive, and reliable means is provided whereby fuel anti-theft protection may be provided. It will be seen that advantageously the present invention requires no modification of the vehicle body itself, needs only the cap member and locking bar of the instant device, and provides the desired protection merely by the locking bar being positioned in the described slotting and abutting positions, with the trunk lid 2 being closed. Nor advantageously are any extra keys required in the present device, as with most prior locking devices. The only key employed with the instant device is that normally employed and supplied as standard issue for operating the locking mechanism conventionally provided with the vehicle's trunk, illustrated as cooperating member 31-32, which normally fastens lid 2 through a lower extension 3 thereof to trunk lower wall 6, with a deformable gasket 7 generally being provided to render the joint therebetween relatively sealed.

What is claimed is:

1. In a locking device for use with a vehicle having a trunk compartment and a fuel tank filling tube inlet located adjacent to and below a vertical lower wall of said trunk compartment, wherein said trunk compartment has a lid element which is pivotally mounted to disengage from said trunk compartment lower wall, when said trunk is opened, and engage said trunk compartment lower wall, when said trunk is closed, and wherein said lid element has an interior wall section which normally is positioned above said trunk compartment lower wall, when said trunk lid is in the closed condition, the improvement comprising:

(1) a removeable cap closure member for said fuel tank filling tube inlet, said cap member being adapted to be placed and tightened onto said filling tube inlet by rotation of said cap member, and said cap member having a slot provided on the exterior thereof adapted to receive a bar element, and (2) a locking bar element having configured, joined upper and lower portions, said upper portion of said bar element extending (a) from its lower end at a point adjacent said filling tube inlet, (b) past, along, and adjacent to said trunk compartment lower wall, and (c) in and then downwardly along a non-linear path around the top of said trunk compartment lower wall, to be adapted thereby to engage and abut said interior wall section of said trunk lid, when said lid is in a closed condition, and said lower portion of said bar element having a lower terminus adapted to be slideably received within said slot in said cap member to retain, when so received, said cap member against rotational movement and against removal from said filling tank inlet, whereby said cap member is adapted to be locked in place on said filling tank inlet.

2. The locking device according to claim 1 wherein said slot on said cap member is provided in a raised flange element positioned on the top of said cap member and said lower portion of said locking bar element extends through said flange element, when said cap member is in a locked condition.

* * * * *